United States Patent [19]

Kuromiya et al.

[11] Patent Number: 5,585,989
[45] Date of Patent: Dec. 17, 1996

[54] MAGNETIC DISC SUBSTRATE AND A MAGNETIC DISC USING THE SAME

[75] Inventors: Miyuki Kuromiya; Hiroshi Takino, both of Kanagawa; Masayoshi Oshima, Saitama; Teiji Kohara, Kanagawa, all of Japan

[73] Assignees: Sony Corporation; Nippon Zeon Co., Ltd., both of Tokyo, Japan

[21] Appl. No.: 347,086

[22] Filed: Nov. 23, 1994

[30] Foreign Application Priority Data

| Nov. 30, 1993 | [JP] | Japan | 5-300278 |
| Nov. 30, 1993 | [JP] | Japan | 5-300279 |
| Feb. 21, 1994 | [JP] | Japan | 6-022476 |

[51] Int. Cl.$^6$ ........................................... G11B 5/82
[52] U.S. Cl. .................................. 360/135; 360/137
[58] Field of Search ............... 360/135, 76, 77.01, 360/77.02, 77.07, 137; 428/900; 524/579, 504; 369/13

[56] References Cited

U.S. PATENT DOCUMENTS

| 4,738,885 | 4/1988 | Matsumoto | 420/900 |
| 5,247,612 | 12/1993 | Sato et al. | 369/13 |
| 5,296,995 | 3/1994 | Yonezawa et al. | 360/135 |
| 5,302,656 | 4/1994 | Kohara et al. | 524/579 |
| 5,379,171 | 1/1995 | Morehouse et al. | 360/97.01 |
| 5,393,584 | 2/1995 | Satoh et al. | 428/900 |
| 5,402,278 | 3/1995 | Morita | 360/135 |

FOREIGN PATENT DOCUMENTS 0155452  9/1985  European Pat. Off. .

OTHER PUBLICATIONS

Derwent Publications, Ltd., London, GB, No. AN 85-071721 (Database WPI, Week 8512) and JP-A-60 026 024 (Nippon Zeon Co., Ltd.), Feb. 8, 1985-abstract.
Derwent Publications, Ltd., London, GB, No. AN 93-009953 (Database WPI, Week 9302) and DE-A-41 37 427 (Hoechst AG), Jan. 14, 1993-abstract.
Derwent Publications, Ltd., London, GB, No. AN 93-380412 (Database WPI, Week 9348) and JP-A-5 282 702 (Kuraray Co.), Oct. 29, 1993-abstract.

*Primary Examiner*—John H. Wolff
*Assistant Examiner*—Adriana Giordana
*Attorney, Agent, or Firm*—Hill, Steadman & Simpson

[57] ABSTRACT

Using a thermoplastic norbornene type plastic as a material for the magnetic disc substrate, a magnetic disc substrate having a small deformation and a high modulus of elasticity is prepared. By optimizing the thickness of the substrate, the resonance frequency of the magnetic disc can be elevated to a level higher than the servo band. As a result, a magnetic disc substrate can form a servo mark having a high positional precision, and can carry out tracking with high precision.

26 Claims, 3 Drawing Sheets

MAGNETIC DISC SUBSTRATE AND A MAGNETIC DISC USING THE SAME

BACKGROUND OF THE INVENTION

The present invention relates to a magnetic disc substrate which uses a thermoplastic norbornene resin. More particularly, the present invention relates to a magnetic disc which can conduct the position control of the magnetic head with high accuracy.

In a magnetic recording medium for recording and reproducing digital information by a magnetic head, for example, a magnetic disc, a servo mark is written to make the magnetic head follow the recording track and to give an address information. In order to carry out a tracking of the magnetic head with high accuracy (hereinafter to control the position so as to follow the record track precisely in a predetermined address is referred to as "tracking"), the resonance frequency of the magnetic disc must be elevated to higher than the servo band. Therefore, materials having high modulus of elasticity, such as alin, glass or ceramics, have been used as a magnetic disc substrate. At the time of recording the data, it has also been carried out to write a position signal to the magnetic disc by writing a servo mark simultaneously by a servo writer.

However, as the width of the recording track is becoming narrower as the density of records becomes high, high positional precision of said position signals becomes necessary. And in the conventional writing method of the position signal, it becomes necessary to maintain high positional precision between the servo writer and the mechanism portion of the magnetic recording device. And there is a problem that since it requires extremely difficult technology, the device becomes expensive.

Therefore, a method has been proposed wherein the positional precision of the position signal is increased by preforming a servo mark in the magnetic disc. For example, there can be mentioned a method in which a servo mark is formed by etching or by non-magnetizing the magnetic layer, or a method in which a magnetic disc substrate is molded by a molding technique and the like, and at the time of molding, an uneven servo mark is formed.

However, in said method to form a servo mark by etching or non-magnetizing a magnetic layer, there is a problem in that the production process of the magnetic disc becomes complicated thereby making the industrial production difficult.

On the other hand, a method to form an uneven servo mark by molding a magnetic disc substrate by a molding technique is excellent productivity-wise and industrially advantageous. However, if the plastic used as a substrate is a polycarbonate, a polymethylmethacrylate the like used for the optical disc substrate, the deformation due to moisture absorption is too big, and it is not suitable. Furthermore, a polymethylpentene, a polystyrene or the like having a low rate of moisture absorption is not preferable because the deformation of the substrate with the crystallization proceeding after the formation is too big since it is a crystallized plastic, or the heat resistance is not sufficient.

Furthermore, since the plastic has a low modulus of elasticity, the resonance frequency of the magnetic disc becomes low, thereby causing a problem in that the resonance frequency larger than the servo band cannot be obtained. Thus, any proper materials suitable as a magnetic disc substrate have not been found in the conventional plastics.

SUMMARY OF THE INVENTION

The object of the present invention, therefore, is to provide a magnetic disc substrate having a high modulus of elasticity, and to provide a magnetic disc substrate capable of tracking with high precision by using such a magnetic disc substrate.

The present inventors made investigations with a view to attaining the above objects, and as a result, it was found that the resonance frequency of the magnetic disc could be elevated to the level higher than a servo band, by using a thermoplastic norbornene type plastic as a material for the magnetic disc substrate and optimizing the thickness of the substrate. Furthermore, the present inventors found that the aforementioned magnetic disc substrate could be formed with a servo mark having high positional precision to become a magnetic disc capable of tracking at high precision.

A magnetic disc substrate according to the present invention can be formed by injection molding of a thermoplastic norbornene resin, and the magnetic disc according to the present invention comprises at least a magnetic layer formed on such a magnetic disc substrate.

The thermoplastic norbornene resin has a small moisture absorption, so that there is no fear of deformation, and has a sufficient heat resistance. Furthermore, by optimizing the thickness thereof, the resonance frequency becomes high. Furthermore, if this thermoplastic norbornene resin is formed by an injection molding, the concave and convex portions of the servo mark-forming portion and those of the recording track-forming portion and the guard band-forming portion will be formed with high positional precision.

The aforementioned magnetic disc substrate may be formed with a plastic composite in which a filler is added to the thermoplastic norbornene resin.

If the plastic composite containing a filler is used, and the particle size and the amount to be contained of the filler are optimized, the modulus of elasticity can be increased without deteriorating the surface roughness. Also in this case, by making the thickness of the magnetic disc substrate optimum, the resonance frequency higher than the servo band can be generated.

On the other hand, if the magnetic disc according to the present invention comprises a magnetic layer formed on the aforementioned magnetic disc substrate, and the magnetic layer is formed uniformly over from the recording track-forming portion to the guard band-forming portion, the boundary between the recording track-forming portion and the guard band-forming portion can be determined with high precision by the concave and convex portions of the magnetic disc substrate, thereby making possible highly precise tracking.

Furthermore, since the magnetized direction on the concave portion is reversed with respect to the magnetized direction on the convex portion to make it possible to determine the magnetization reversal portion where the leakage of the magnetic flux is caused with high precision by the boundary between the concave portion and the convex portion, a highly precise tracking is made possible.

Since the magnetic disc according to the present invention can make the generated resonance frequency high, when a recorded signal is reproduced by a magnetic head, the servo mark can be read out easily.

Furthermore, the concave and convex portions of the servo mark-forming portion can be formed with high positional precision by injection molding, without any deformation of the formed magnetic disc substrate, thereby the servo mark can be formed with high precision to make it possible to track the magnetic head with high precision.

Therefore, by applying the present invention, it becomes possible to increase the track pitch and to record with higher density. Furthermore, since it becomes possible to produce a disc having a small formation change with lapse of time on a massive scale at a cheap cost, the industrial value is extremely large.

DESCRIPTION OF THE PREFERRED EMBODIMENT

A thermoplastic norbornene resin used for a magnetic disc substrate in the present invention is disclosed in Japanese Unexamined Patent Publication No. Sho 51-80400, Japanese Unexamined Patent Publication No. Sho 60-26024, Japanese Unexamined Patent Publication No. Hei 1-168725, Japanese Unexamined Patent Publication No. Hei 1-190726, Japanese Unexamined Patent Publication No. Hei 3-14882, Japanese Unexamined Patent Publication No. Hei 3-122137, and Japanese Unexamined Patent Publication No. Hei 4-63807. Specifically, there can be mentioned ring-opening polymers of norbornene type monomers, ring-opening polymers hydrogenated product of norbornene type monomers, addition polymers of norbornene type monomers, addition copolymers of norbornene type monomers and an olefin, and the like.

As monomers to obtain a thermoplastic norbornene resin, there can be used known monomers in the aforementioned Publications, Japanese Unexamined Patent Publication No. Hei 2-27424, and Japanese Unexamined Patent Publication No. Hei 2-276842. For example, there can be mentioned polar group substituents such as norbornene, alkyl thereof, alkylidene, alkenyl, aromatic substitution derivatives and halogen of substituted or unsubstituted olefin thereof, hydroxyl groups, ester groups, alkoxy groups, cyano groups, amido groups, imide groups, and silyl groups. Concretely, there can be mentioned 2-norbornene, 5-methyl-2-norbornene, 5,5-dimethyl-2-norbornene, 5-ethyl-2-norbornene, 5-butyl-2-norbornene, 5-hexyl-2-norbornene, 5-octyl-2-norbornene, 5-octadecyl-2-norbornene, 5-ethylidene-2-norbornene, 5-isopropenyl-2-norbornene, 5-methoxycarbonyl-2-norbornene, 5-cyano-2-norbornene, 5-methyl-5-methoxycarbonyl-2-norbornene,, 5-phenyl-2-norbornene, 5-phenyl-5-methyl-norbornene, and the like.

Also, monomers having one or more cyclopentadiene added to norbornene and the derivatives and substituents thereof as mentioned above may be used. As concrete examples, there can be mentioned 1,4:5,8-dimethano-1,4, :4a,5,6,7,8,8a-octahydro naphthalene, 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethylidene-1,4:5,8-dimethano-1,4,4a,5,6,7,8,8a-octahydronaphthalene, 6-methyl-6-methoxycarbonyl-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, and the like.

Furthermore, monomers having a polycyclic structure with lots of cyclopentadiene, and the derivatives and substituents thereof as mentioned above may be used. As concrete examples, there can be mentioned dicyclopentadiene, 1,4:5,8-dimethano-1,2,3,4,4,5,8,8a-2,3-cyclopentadienonaphthalene, 1,4:5,10:6,9-trimethano-1,2,3,4,4a,5,6a,6,9,9a,10,10a-dodecahydro-3,4-cyclopentadienoanthracene, 2,3-dihydrodicyclopentadiene and the like.

Furthermore, cyclopentadiene and tetrahydroindene, indene, benzofuran and the like and addition products thereof, derivatives and substituents thereof as described above may be used. As concrete example, there can be mentioned 1,4-methano-1,4,4a,4b,5,8,8a,9a-octahydrofluorene, 5,8-methano-1,2,3,4,4a,5,8,8a-octahydro-2,3-cyclopentadienonaphthalene, 1,4-methano-1,4,4a,9a-tetrahydrofluorene, 1,4-methano-1,4,4a,9a-tetrahydrodibenzofuran and the like.

The thermoplastic norbornene resin used in the present invention contains at least one monomer selected from the aforementioned monomers, and may contain a monomer in addition to aforementioned monomers which is copolymerizable with these monomers within a range where the characteristics of polymers to be aimed, such as solubility and the like, is not substantially damaged or is improved. As copolymerizable monomers, there can be mentioned cycloolefins such as cyclopentene, cyclohexene, cycloheptene, cyclooctene and the like.

Furthermore, in the case where the thermoplastic norbornene resin is an addition copolymer of a norbornene type monomer and an olefin, α-olefin such as ethylene, propylene, 1-butene, 1-hexene, 4-methyl-1-pentene, styrene and the like is used as an olefin.

The limiting viscosity [η of these thermoplastic norbornene resins], measured in decalin or toluene at 25° C. is 0.01–20 dl/g, preferably 0.05–10 dl/g, and more preferably 0.1–5 dl/g. If the limiting viscosity is too small, the thermoplastic norbornene resins cannot keep it shape as a polymer, and if it is too large, the moldability is degraded.

Furthermore, the glass transition temperature (hereinafter referred to as "Tg") of these thermoplastic norbornene resins is 50° C.–200° C., preferably 70° C.–180° C., and more preferably 80° C.–160° C.

To the aforementioned thermoplastic norbornene resins, various additives such as phenol-type or phosphorus-type antioxidants, benzophenone-type ultraviolet ray-absorbents, light-resistant stabilizers, antistatic agents, esters of aliphatic alcohol, lubricants such as partial esters and partial ethers of polyhydric alcohol may be added, as desired. Furthermore, other resins, rubber polymers and the like may be used in a mixture, as long as the attainment of the objects of the present invention is not hindered.

And, the thickness of the magnetic disc substrate using the thermoplastic norbornene resins as described above is made thicker than the thickness 0.89 mm of a 2.5 inch substrate of a magnetic disc using a glass substrate. Concretely, it is preferred that when the diameter is 95 mm, the thickness should be 2.6–3.0 mm; when the diameter is 65 mm, the thickness should be 0.9–2.0 mm; when the diameter is 48 mm, the thickness should be 0.5–1.8 mm; when the diameter is 34 mm, the thickness is made to be 0.2–1.6 mm.

If the thickness of the substrate is too thin, the resonance frequency of the magnetic disc becomes low, and conversely, if the thickness of the substrate is too thick, the magnetic disc becomes too large, and it becomes difficult to house the necessary amounts in a limited space of the magnetic recording device.

Furthermore, it is preferred that the magnetic disc substrate be formed so that the servo mark-forming portion has concave and convex portions by injection molding. Moreover, it is preferred that the recording track-forming portion have a convex shape and the guard band-forming portion have a concave shape.

Incidentally, since a stamper used in injection molding of said magnetic disc substrate is processed by a mastering technique which has been used for forming servo marks of the optical magnetic disc, the positional precision of unevenness in said servo mark-forming portion, and concave and convex portions in said recording track-forming portion and said guard band-forming portion is extremely high.

Furthermore, in said magnetic disc substrate, a thermoplastic norbornene resin to which a filler is added as a substrate material may be used, but in this case, it is preferred that the thickness be changed as follows. Namely, it is preferable that when the diameter is to be 95 mm, the thickness should be 1.5–2.6 mm; when the diameter is to be 65 mm, the thickness should be 0.5–1.8 mm; when the diameter is to be 48 mm, the thickness should be 0.28–1.6 mm; when the diameter is to be 34 mm, the thickness is to be 0.10–1.4 mm. By incorporating a filler, a magnetic disc substrate having a high modulus of elasticity can be provided, and with the thickness of the aforementioned conditions, the resonance frequency of the magnetic disc can be elevated to a level higher than the servo band. If the thickness is too thick, it becomes difficult to house the necessary amounts within the limited space of the magnetic recording device.

In said magnetic disc substrate, the filler is not exposed on the surface of the magnetic disc substrate, and said magnetic disc substrate is covered with a matrix resin of a plastic composite (a thermoplastic norbornene resin). As said filler, one which is harder than the matrix resin is desirable, and an inorganic filler is preferably used. The filler used in the present invention has particles with an average particle size of 0.005–1.5 µm, preferably 0.01–0.8 µm, and more preferably 0.05–0.6 µm. Furthermore, a filler having a small particle size distribution is preferable, in which particles in the range of 1/5 to 2 times as large as the average particle size occupy 70% by weight or more, preferably 80% by weight or more, more preferably 90% by weight or more. Moreover, the shape of the filler has a spherical shape, and the closer it is to the perfect round shape, the more preferable. As long as these conditions are satisfied, a magnetic disc substrate which contains plural kinds of fillers therein, and has plural number of peaks of the particle size distribution may be used.

If said average particle size is too small, the melt flow at the time of molding the plastic composite is degraded, and on the contrary, if it is too large, the surface roughness of the molded article becomes bad, and the transferability of the servo mark becomes poor. If said particle size distribution is too large, even if the average particle size is small, the surface roughness of a part of the molded article may become bad, and a substrate having uniform physical properties may not be obtained. As the shape of said filler goes away from the perfect round shape, the melt viscosity of the plastic composite becomes high, the moldability is degraded and the surface roughness of the molded article is deteriorated.

The quality of the material of the filler is not particularly limited as long as it is solid-state inorganic material. As examples, there can be mentioned silica, glass, alina, talc, calci carbonate, alin hydroxide, magnesi hydroxide, calci sulfate, bari sulfate, metal oxides (zinc oxide, magnesi oxide, iron oxide, titani oxide, alin oxide, antimony oxide and the like), double salts (al and clay), quartz, kaolin, warastnite, mica, carbon black, molybden sulfide and the like. Among them, silica, glass, quartz and alina are preferable.

It is preferable that said plastic composite be composed of 70–99 weight percent of said thermoplastic norbornene resin and 30–1 weight percent of inorganic filler having a spherical shape with the average particle size of 0.005–1 µm. Preferably, it is composed of 75–95 weight percent of said thermoplastic norbornene resin and 25–5 weight percent of said inorganic filler, more preferably, it is composed of 80–90 weight percent of said thermoplastic norbornene resin and 20–10 weight percent of said inorganic filler. If the incorporation amount of the filler is too small, the improvement of the modulus of elasticity of the molded substrate is not sufficient, and if the incorporation amount of the filler is too large, the melt flowability at the time of molding the substrate becomes bad, and the moldability and the transferability of the servo mark are deteriorated.

In order to manufacture the magnetic disc substrate by using said composite materials, first, for example, a thermoplastic norbornene resin and an inorganic filler, and additives according to need are mixed. The method to mix them is not particularly limited, so far as the filler and additives are sufficiently dispersed in the resin. It is preferred that the primary particles of the filler be dispersed, however, even in the case that the filler is not sufficiently dispersed and aggregated, it is desirable that the particle size of the aggregated mass should be less than 2 µm, preferably less than 1 µm.

And, the materials mixed in the manner described above, is molded into the shape of the magnetic disc substrate by the injection molding method. The magnetic disc molded in this manner is excellent in dimensional stablility, and the coefficient of linear expansion of the substrate thereof is generally $3\times10^{-5}$ to $6\times10^{-5}$ $deg^{-1}$, whereas that of the substrate obtained by molding the thermoplastic norbornene resin is about $6\times10^{-5}$ to $8\times10^{-5}$ $deg^{-1}$. Moreover, the flexural modulus of elasticity of the substrate thereof becomes 25,000 to 70,000 $kg/cm^2$ by incorporating the filler, whereas the flexural modulus of elasticity of the substrate obtained by molding the thermoplastic norbornene resin is less than 25,000 $kg/cm^2$.

Said magnetic disc substrate according to the present invention is excellent in surface roughness. When a mold die whose surface is polished like a mirror surface is used, the surface roughness of the substrate obtained by injection molding of the thermoplastic norbornene resin is generally 0.017 to 0.020 µm at the maxim roughness Rmax value, and even if a certain filler is added, the substrate has the similar surface roughness.

The magnetic disc according to the present invention is composed of at least a magnetic layer formed on the magnetic disc substrate having materials and shapes described above.

The magnetic layer formed on this magnetic disc substrate is formed evenly over from the recording track-forming portion to the guard band-forming portion. Thereby, the boundary between the recording track and the guard band in the magnetic disc is determined by the concave and convex portions of the magnetic disc substrate. However, since the concave and convex portions are formed by transferring the stamper fixed in the mold die at the time of injection molding, their positions are extremely precise. Thereby, a track pitch of, for example, 5.2 μm is obtained, but it is possible to obtain a track pitch of less than 5.0 μm.

Furthermore, by said injection molding, the servo mark-forming portion in said magnetic disc substrate may be formed so that it has concave and convex portions. Incidentally, hereinafter, "the servo mark-forming portion" in the magnetic disc substrate stands for a portion where a servo mark is formed, when a magnetic layer is formed on said magnetic disc substrate to form a magnetic disc.

The magnetic layer formed on the concave and convex portions of this servo mark-forming portion is so formed that the magnetized direction on the concave portion is reverse to that on the convex portion. Thereby, the magnetization reversal portion where leakage of the magnetic flux is caused is to be determined by the boundary of the concave portions and the convex portions of the magnetic disc substrate, however, since the concave and convex portions are formed by transferring the stamper fixed in the mold die at the time of injection molding, the positional precision of the servo mark becomes excellent. Thereby, the servo mark can be formed in a size smaller than, for example, 1.2 μm, but it is possible to form the servo mark to be smaller than 1.0 μm, and also to be around 0.6 μm at the minimum.

Figure 1:
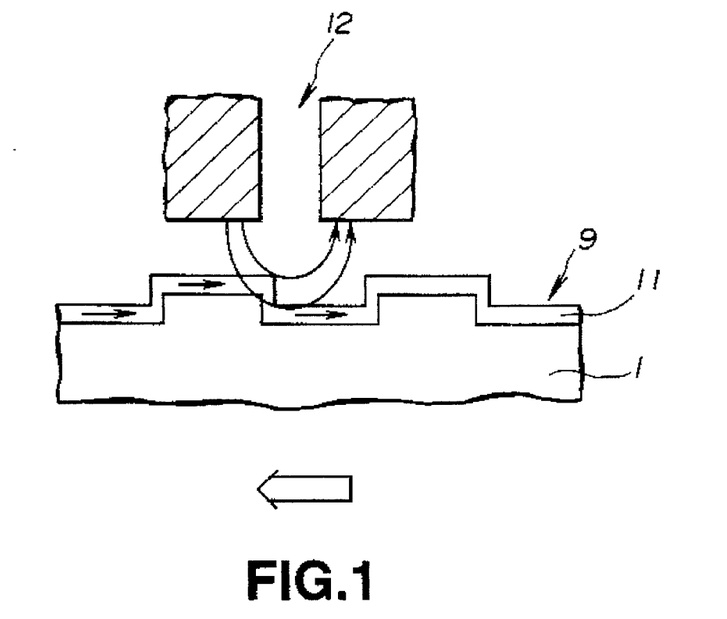
FIG. 1 is a conceptual view showing a first stage of the servo write operation according to a two-stage magnetization method.
Figure 2:
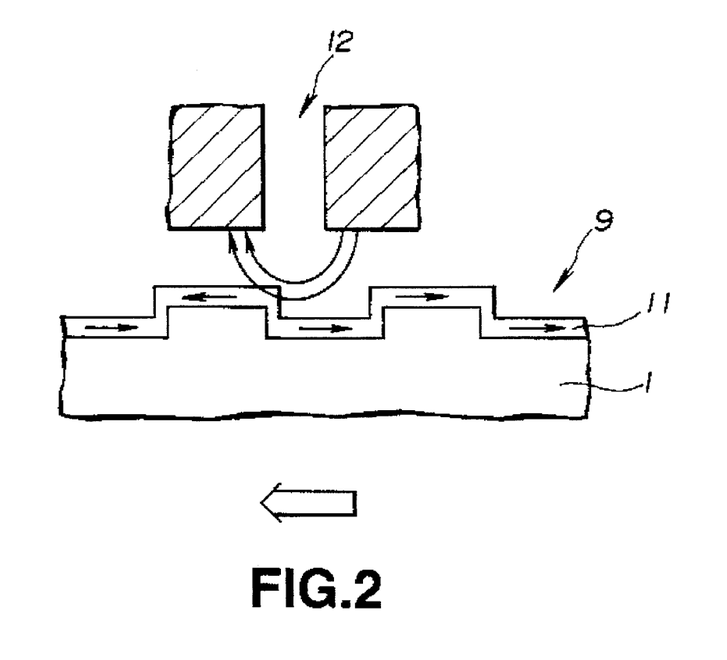
FIG. 2 is a conceptual view showing the second stage of the servo write operation according to a two-stage magnetization method.

In order to record said servo mark, for example, servo write may be conducted according to the two-stage magnetization method. Namely, in the first stage, as shown in FIG. 1, with a sufficiently large recording current by using a magnetic head 12, a magnetic layer is magnetized in the same direction, even if it is a magnetic layer 11 on the concave portion or a magnetic layer 11 on the convex portion of a magnetic disc substrate 1. In the second stage, as shown in FIG. 2, with a smaller recording current than that of the first stage, only the magnetized direction of the magnetic layer on the convex portion is reversed. As a result, the magnetized direction of the concave portion and the convex portion becomes opposite, and the leakage of the magnetic flux generated from the magnetization reversal portion which is the boundary of the concave portion and the convex portion becomes the position signal.

In the magnetic disc according to the present invention, a backing layer, a protection layer, an application layer of a lubricant may be provided in addition to a magnetic layer on the magnetic disc substrate. With regard to the materials to compose the backing layer, the protection layer and the lubricant-applied layer and a method to form them, conventional methods can be used, and they are not particularly critical, but a typical method is to form a backing layer by sputtering Cr, Mo and the like, a magnetic layer by sputtering a metallic magnetic thin film of CoPt, CoPd, CoCrPt and the like and a protection layer by sputtering C, $SiO^2$, respectively. Furthermore, as a lubricant-applied layer, for example, a lubricant such as Fomblin Z-DOL (product name) and the like may be applied by a spin coating method to form a lubricant application layer.

Concrete examples which apply the present invention will now be described in detail with reference to accompanying drawings.

EXAMPLE 1

One example of the magnetic disc according to this embodiment will now described. This magnetic disc comprises a backing layer, a magnetic layer, a protection layer and a lubricant-applied layer provided in sequence on the magnetic disc substrate.

Figure 3:
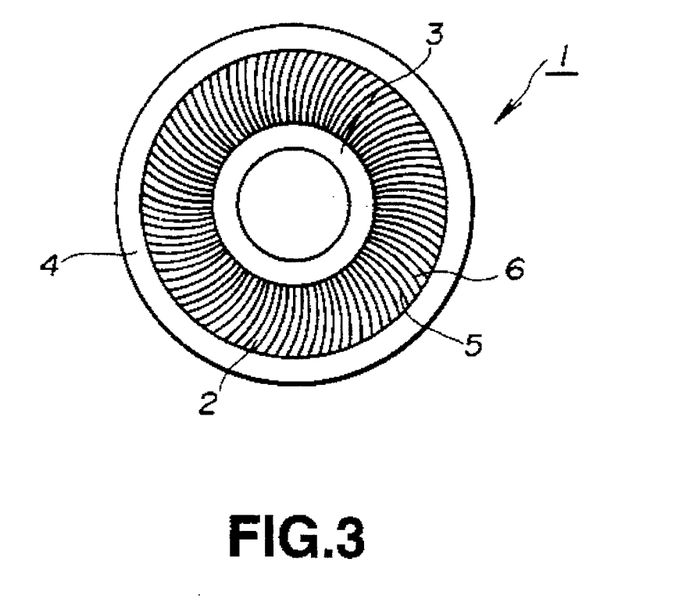
FIG. 3 is a plan view showing conceptually the magnetic disc substrate constituting the magnetic disc of the present invention.

Said magnetic disc substrate 1 is substantially disc-like shape having a diameter of 65 mm and a thickness of 1.2 mm, comprising a thermoplastic norbornene resin, the product name "ZEONEX480" manufactured by Nippon Zeon Co. And, concretely, it comprises, as shown in FIG. 3, a recording region-forming portion 2, clamp portions 3 located in the inner peripheral side and the outer peripheral side of said recording region-forming portion 2, and a landing portion 4.

Said recording area-forming portion 2 comprises a data region-forming portion 5 which is a region where the magnetic layer (not shown) formed thereon actually records the data and a servo mark-forming portion 6 where the information for controlling the positions in the address and the recording track are preformed.

Figure 4:
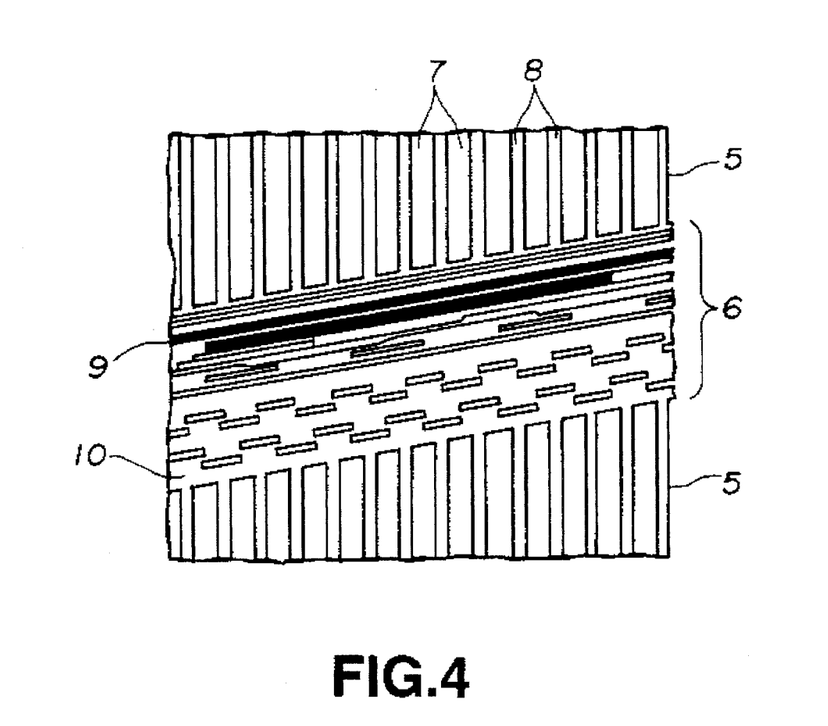
FIG. 4 is a plan view showing conceptually a part of the magnetic disc substrate constituting the magnetic disc of the present invention.

Said recording region-forming portion 2 is shown on a larger scale in FIG. 4. As shown in FIG. 4, said data region-forming portion 5 comprises a recording track-forming portion 7 and a guard band-forming portion 8, and said servo mark-forming portion 6 comprises an address mark-forming portion 9 and a fine mark-forming portion 10. And as described above, in the data region-forming portion 5, the recording track-forming portion 7 is a convex shape, and the guard band-forming portion 8 is a concave shape, and concave and convex portions are provided also in the servo mark-forming portion 6.

On the magnetic disc substrate 1 as described above, a backing layer (not shown) is formed, and a magnetic layer is formed thereon, and in said data region-forming portion 5, a magnetic layer is uniformly formed even in the recording track-forming portion 8 or in the guard band-forming portion 8, and the magnetic layer on the concave and convex portions of the servo mark-forming portion 6 is so formed that the magnetized direction on the concave portion is reversed against the magnetized direction on the convex portion.

Also on the magnetic layer, there are provided a protection layer and a lubricant-applied layer.

In order to prepare a magnetic disc having a structure described above, first, a pellet of said thermoplastic norbornene resin was injection-molded into a shape described above in an injection molding machine (DISC-5 manufactured by Sumitomo Jyukikai Kogyo Co.) using a mold having a stamper fixed therein, at a resin temperature of 340° C., and a mold temperature of 110° C.

Then, on said magnetic disc substrate 1, a backing layer comprising Cr was formed in a thickness of 150 nm, a magnetic layer comprising CoCrPt was formed in a thickness of 60 nm, and a protection film comprising C was formed in a thickness of 10 nm, respectively, by a sputtering method. Furthermore, a lubricant comprising "Fomblin Z-DOL" (product name) was applied in a thickness of 2 nm.

Furthermore, the preformat of the servo mark to the servo mark-forming portion 6 was carried out by a two-stage magnetization method using a magnetic head having a magnetic gap of 0.3 μm and a track width of 4.0 μm.

As described above, a sample disc of Example 1 was completed, and 100 pcs. of the sample disc were prepared.

EXAMPLE 2

A magnetic disc was prepared in the same manner as in Example 1 except that the thickness of the magnetic disc substrate 1 was 1.0 mm to obtain a sample disc of Example 2.

EXAMPLE 3

A magnetic disc was prepared in the same manner as in Example 1 except that the thickness of the magnetic disc substrate 1 was 0.8 mm to obtain a sample disc of Example 3.

EXAMPLE 4

A magnetic disc having the same structure as in Example 1 was prepared except that the concave and convex portions were not provided on the servo mark-forming portion 8 of the magnetic disc substrate 1, and the servo mark was formed by the magnetic reversal of the magnetic layer formed thereon, to obtain a sample disc of Example 4.

EXAMPLE 5

A magnetic disc having the same structure as in Example 1 was prepared except that the concave and convex portions were not provided on the servo mark-forming portion 6 of the magnetic disc substrate 1, and the servo mark was formed by etching and non-magnetizing the magnetic layer formed thereon, to obtain a sample disc of Example 5.

COMPARATIVE EXAMPLE 1

A magnetic disc was prepared in the same manner as in Example 1 except that a polycarbonate resin, a product name, Pan Light AD-5503 manufactured by Teijin Kasei Co. was used instead of the thermoplastic norbornene resin to obtain a sample disc of Comparative Example 1.

Evaluation of the Properties

Various properties were evaluated with respect to the Examples 1 to 5, and Comparative Example 1 prepared as described above.

First, the surface of the magnetic disc substrate was observed. All magnetic disc substrates showed such an excellent transferability in that the positional precision of the servo mark was such that the deviation in position in the radial direction was 0.010 μm or less, and the deviation in position in the peripheral direction was 0.007 μm or less.

Furthermore, the magnetic property was measured and it was found that the coercive force Hc of all sample discs were 120 kA/m.

Then, the resonance frequencies of the sample discs in Examples 1 to 3 were measured. Table 1 shows the thickness of the magnetic disc substrate and the resonance frequency of each sample disc.

TABLE 1

| | Thickness of the disk substrate (mm) | Resonance frequency (Hz) |
|---|---|---|
| Example 1 | 1.2 | 601.2 |
| Example 2 | 1.0 | 501.0 |
| Example 3 | 0.8 | 400.8 |

From table 1, it is seen that by making the thickness of the magnetic disc substrate thicker, the resonance frequency can be increased. If the servo band is 450 Hz, it is necessary to generate the resonance frequency at least larger than 450 Hz. Therefore, at the time of reproduction by the MR head, the servo output signal could be sufficiently separated in the sample discs in Examples 1 and 2, but in the sample disc in Example 3, the servo output signal could not be sufficiently separated.

For reference, the thickness of the magnetic disc substrate which can obtain the resonance frequency larger than 450 Hz which is the servo band is shown in Table 2, with respect to various substrate sizes.

TABLE 2

| Disc substrate size (mm) | Thickness of the magnetic disc substrate which can obtain the resonance frequency larger than 450 Hz (mm) |
|---|---|
| 95 | 2.6 |
| 65 | 0.9 |
| 48 | 0.5 |
| 34 | 0.2 |

Subsequently, with respect to the sample discs of Examples 1, 4 and 5, the servo output obtained from the servo mark was measured.

The servo output was measured by applying the current of 18 mA and its frying height of 67 nm to the servo mark having the recording density of about 33 kfci, by a MR head having the magnetic gap of 0.3 μm and the track width of 4.5 μm.

Figure 5:
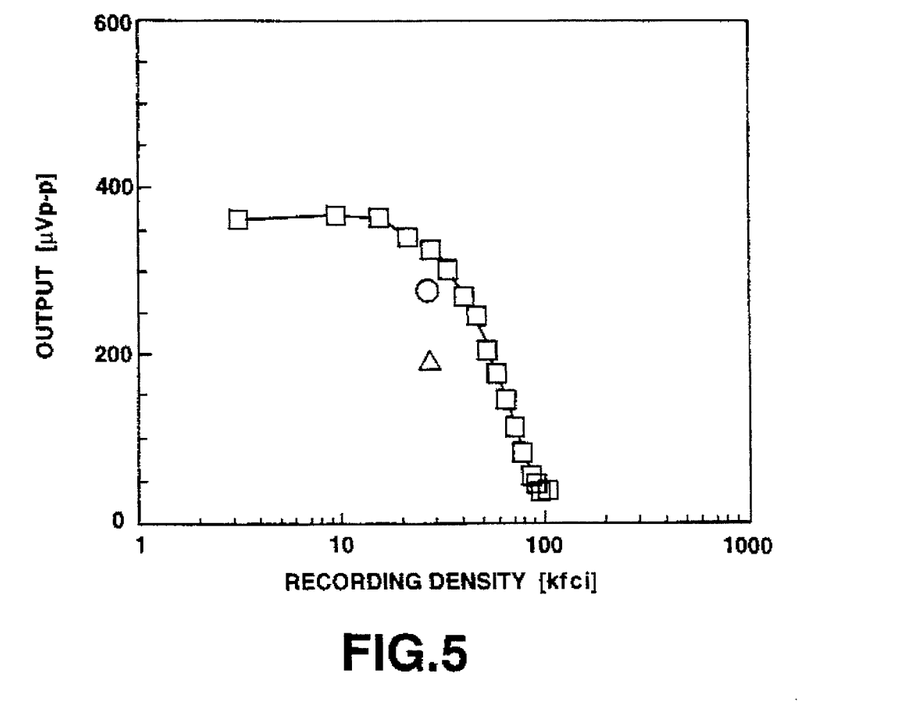
FIG. 5 is a characteristic view showing the difference of the servo output according to the formation method of the servo mark.

In FIG. 5, the servo output of the sample disc of Example 1 is shown by way of the symbol "o", the servo output of the sample disc of Example 4 is shown by the way of the symbol "□", and the servo output of the sample disc of Example 5 is shown by the way of the symbol "Δ".

From FIG. 5, it is seen that the servo output of Example 1 is not largely varied compared with that of Example 4, but is higher than that of Example 5 by about 4 dB, in the record density of about 33 kfci.

Since the servo mark of the sample disc in Example 1 is determined by the concave and convex portions, the positional precision thereof is higher than that of Example 4, and from the above results, it was found that the servo output obtained from this servo mark could be read sufficiently.

Furthermore, the sample disc of Example 1 and Comparative Example 1 were kept for a long period of time to study the deformation of the magnetic disc substrate.

The magnetic disc substrate used in Example 1 and the magnetic disc substrate used in Comparative Example 1 were stored in a clean oven in an atmosphere of 90% RH to study deformation or the deformed amount of the substrate. Deformation or the deformed amount of the substrate is shown in FIG. 6, as an elongation rate of the diameter after moisture absorption with respect to the diameter before moisture absorption.

Figure 6:
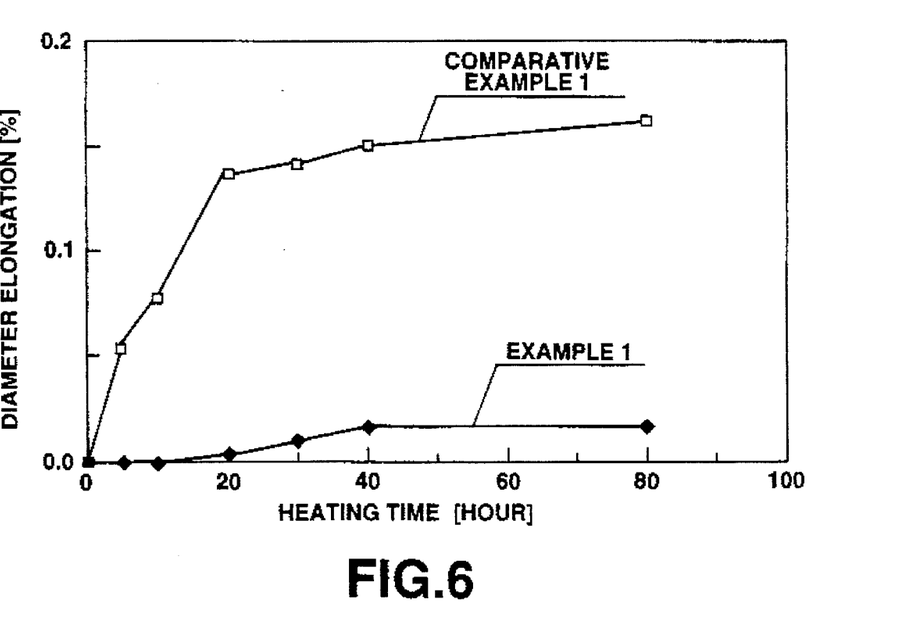
FIG. 6 is a characteristic view showing the difference of a diameter elongation rate between a magnetic disc substrate comprising a thermoplastic norbornene resin and a magnetic disc substrate comprising a polycarbonate resin.

From FIG. 6, it is seen that the magnetic disc substrate used in Example 1 has a smaller elongation rate compared to that of the magnetic disc substrate used in Comparative Example 1. Namely, it is seen that the thermoplastic norbornene resin has smaller hygroscopicity compared with the polycarbonate resin, and therefore the deformed amount of the substrate is small.

Furthermore, the run-out amount was studied and it was found that in the magnetic disc substrate of Example 1, there were seen no large changes between 10 μm before moisture absorption and 10 μm after moisture absorption, while it was deteriorated in the magnetic disc substrate of Comparative Example 1 such that 10 μm before moisture absorption and 30 μm after moisture absorption. As a result, the run-out amount exceeded the allowable value 20 μm of the run-out amount enabling 0.05 μm of the floated amount of the magnetic head, and the magnetic head did not float.

EXAMPLE 6

One example of the magnetic disc according to this embodiment will now be described. This magnetic disc comprises a backing layer, a magnetic layer, a protection layer and a lubricant-applied layer provided in sequence on the magnetic disc substrate.

Said magnetic disc substrate 1 is substantially disc-like shape having a diameter of 65 mm and a thickness of 0.8 mm, comprising a thermoplastic norbornene resin containing a filler, and as in Example 1, comprises as shown in FIG. 3, a recording region-forming portion 2, clamp portions 3 located in the inner peripheral side and the outer peripheral side of said recording region-forming portion 2, and a landing portion 4.

Said recording area-forming portion 2 is a portion to be a recording region when it is formed to be a magnetic disc, and comprises a data region-forming portion 5 which is a region where a region to record the data is actually formed and a servo mark-forming portion 6 where a servo mark for controlling the positions in the address and the recording track (i.e., for tracking) is formed.

As said recording region-forming portion 2 is shown on a larger scale in FIG. 4, said data region-forming portion 5 comprises a recording track-forming portion 7 and a guard band-forming portion 8 which becomes a recording track and a guard band, respectively, when the data region-forming portion is formed to be a magnetic disc. And said recording track-forming portion 7 is formed to be a convex shape, and said guard band-forming portion 8 is formed to be a concave shape.

On the other hand, said servo mark-forming portion 6 comprises an address mark-forming portion 9 and a fine mark-forming portion 10 which becomes an address mark and a fine mark, respectively, when said servo mark-forming portion 6 is formed to be a magnetic disc. And also in this servo mark-forming portion 6, concave and convex portions corresponding to the address mark and the fine mark are formed On said magnetic disc substrate 1a backing layer (not shown) is formed, and a magnetic layer is formed thereon, and in said data region-forming portion 5, a magnetic layer is uniformly formed even in the recording track-forming portion 8 or in the guard band-forming portion 8. And the magnetic layer on the concave and convex portions of the servo mark-forming portion 6 is so formed that the magnetized direction on the concave portion is reversed with respect to the magnetized direction on the convex portion.

Also on the magnetic layer, there are provided a protection layer and a lubricant-applied layer.

In order to produce a magnetic disc having a structure described above, first, a pellet of the thermoplastic norbornene resin containing a filler constituting the magnetic disc substrate 1 was prepared. Using a biaxial extruder having a diameter of 35 mm (Product name: TEM35B, manufactured by Toshiba Kikai Co.), 25 parts by weight of synthesized quartz spherical filler (Product name: Admafine SO-C2, manufactured by Tatsumori Co.), in which an average particle size was 0.5 μm, and particles having a particle size of 0.1 to 1 μm were contained in 95% by weight of more, was added to 100 parts by weight of a ring-opening polymer hydrogenated product of a norbornene type monomer (Product name: ZEONEX480 manufactured by Nippon Zeon Co., Glass transition point: about 140° C.), and the mixture was kneaded at a resin temperature of 250° C., extruded from the die into a transition point: about 140° C.), and the mixture was kneaded at a resin temperature of 250° C., extruded from the die into a strand form, and pelletized by a pelletizer.

Next, the aforementioned pellet was injection-molded into the shape of the magnetic disc substrate 1. Specifically, the pellet was injection-molded into a shape having a diameter of 65 mm and a thickness of 0.8 mm, by using an injection molding machine (DISC-5 manufactured by Sumitomo Jyukikai Kogyo Co.) and, a mold having a stamper fixed therein, at a resin temperature of 340° C., and a mold temperature of 110° C.

Then, on said magnetic disc substrate 1, a backing layer comprising Cr (100 nm), a magnetic layer comprising CoCrPt (60 nm), and a protection film comprising C (10 nm) was formed in sequence by a sputtering method. For sputtering, an in-line type statically opposed DC magnetron sputtering device was used, an alloy target was used for a magnetic layer, thus films were formed in an atmosphere of argon gas. Furthermore, a lubricant (Product name: Fomblin Z-DOL, manufactured by Monte Cathiny Co.) was applied on the protection film by dipping.

And, the preformat of the servo mark to the servo mark-forming portion 6 was carried out by a two-stage magnetization method using a magnetic head having a magnetic gap of 0.3 μm and a track width of 4.0 μm.

A sample disc of Example 6 was thus completed as described above, and 100 pcs. of the sample disc were prepared.

EXAMPLE 7

A pellet was prepared in the same manner as in Example 1, except that 20 parts by weight of a synthesized quartz spherical filler (Product name: Admafine SO-C3, manufactured by Tatsumori Co.) in which an average particle size was 1.0 μm, and particles having a particle size of 0.2 to 2 μm were contained in 95% by weight or more was used as a filler. And by using this pellet, a magnetic disc substrate was injection-molded in the same manner as in Example 6 to prepare a magnetic disc, and thus a sample disc of Example 7 was obtained.

EXAMPLE 8

A pellet was prepared in the same manner as in Example 6, except that 60 parts by weight of the same filler as used in Example 6 was used. And by using this pellet, a magnetic disc substrate was injection-molded in the same manner as in Example 6 to prepare a magnetic disc, and thus a sample disc of Example 8 was obtained.

EXAMPLE 9

A pellet was prepared in the same manner as in Example 6, except that 25 parts by weight of a crystalline soft silica having an average particle size of 2.2 μm (Product name: IMSIL A-108, manufactured by Tatsumori Co.) was used as a filler. And by using this pellet, a magnetic disc substrate was injection-molded in the same manner as in Example 6 to prepare a magnetic disc, and thus a sample disc of Example 9 was obtained.

EXAMPLE 10

A magnetic disc substrate 1 was injection-molded in the same manner as in Example 6 except that the thickness of the substrate was changed to 0.7 mm, to prepare a magnetic disc, and thus a sample disc of Example 10 was obtained.

EXAMPLE 11

A magnetic disc substrate 1 was injection-molded in the same manner as in Example 6 except that the thickness of the substrate was changed to 0.48 mm, to prepare a magnetic disc, and thus a sample disc of Example 11 was obtained.

EXAMPLE 12

A magnetic disc was prepared in the same manner as in Example 6 except that concave and convex portions were not provided on the servo mark-forming portion 6 of the magnetic disc substrate 1, and the servo mark was formed by the magnetic reversal of the magnetic layer formed on this magnetic disc substrate 1 to obtain a sample disc of Example 12.

EXAMPLE 13

A magnetic disc was prepared in the same manner as in Example 6 except that concave and convex portions were not provided on the servo mark-foaming portion 6 of the magnetic disc substrate 1, and the servo mark was formed by etching and magnetizing the magnetic layer formed on this magnetic disc substrate 1 to obtain a sample disc of Example 13.

COMPARATIVE EXAMPLE 2

A magnetic disc having the same shape as that of Example 6 was prepared in the same manner as in Example 6 except that a thermoplastic norbornene resin not containing a filler was used to obtain a sample disc of Comparative Example 2.

Evaluation of the Properties

Various experiments were conducted with respect to thus prepared sample discs and various properties were evaluated.

First, as Experiment 1, the magnetic properties of each sample disc of Examples 6 to 13 and Comparative Example 2 were measured. When the coercive force Hc was measured by a magneto-optical Kerr effect-measuring device (the maxim applied magnetic field 517 kA/m), the coercive force was 120 kA/m in all sample discs, thus it was found that all of them had a magnetic properties usable as a magnetic disc.

Next, the properties of the magnetic disc substrate 1 which constitutes each sample disc were evaluated.

As Experiment 2, the melt index value at 280° C. of the pellet of a plastic composite containing a filler which constitutes the magnetic disc substrate 1 was measured with respect to Examples 6 to 9, and Comparative Example 2. Incidentally, the measurement was carried out conforming to JIS K6719. The result is shown in Table 3.

TABLE 3

|  | Melt Index Value (g/min) | Flexural modulus of elasticity (kg/cm$^2$) |
| --- | --- | --- |
| Example 6 | 25 | 45000 |
| Example 7 | 27 | 41000 |
| Example 8 | 19 | 63000 |
| Example 9 | 21 | 46000 |
| Comparative Example 2 | 29 | 24000 |

From Table 3, it is seen that in the pellets containing a filler in Examples 6 to 9, the melt index value was more or less deteriorated compared to the pellet not containing a filler in Comparative Example 2, however, it was not a value affecting the molding substantially.

Moreover, as Experiment 3, the aforementioned each pellet was injection-molded at a resin temperature of 290° C. by using an injection molding machine (Product name: FS80, manufactured by Nissei Jushi Kogyo Co.), and a test piece was molded for a bending test conforming to ASTM D-790 to measure the flexural modulus of elasticity. The result is shown together in Table 3.

From Table 3, it was seen that in the test pieces in Examples 6 to 9, the flexural modulus of elasticity becomes extremely large compared to that of Comparative Example 2.

As described above, it is seen from Experiments 2 and 3, that when the magnetic disc substrate is composed of a plastic composite containing a filler, the flexural modulus of elasticity can be increased without damaging the moldability.

Next, as Experiment 4, with respect to each sample disc of Examples 6 to 13 and Comparative Example 2, the concave and convex portions formed on the servo mark-forming portion 6 of the magnetic disc substrate 1 were observed. The positional precision of the concave and convex portions in the sample discs of Examples 6, 7, 10 and 13, and Comparative Example 2 was such that the deviation in position in the radial direction in either of them was 0.010 μm or less, and the deviation in position in a peripheral direction in either of them was 0.007 μm or less, and showed the excellent transferability. On the other hand, in the sample discs of Examples 8 and 9, the transferability was poor.

Furthermore, as Experiment 5, the surface roughness of the mirror surface portion where the groove was not formed on the surface of the stamper side of the magnetic disc substrate 1 was checked. As a result, in sample discs of Examples 6, 7, 10 and 13, and Comparative Example 2, it was so smooth that the surface roughness Rmax was 0.017 μm, and the average roughness was 0.002 μm. On the other hand, in sample disc of Example 8, the Rmax value was 0.63 μm at maxim and 0.45 μm at minim, and in sample disc of Example 9, the Rmax value was 0.59 μm at maxim and 0.30 μm at minim, thus they were poor in the smoothness.

Thus, it is seen from Experiments 4 and 5, that if the content of the filler is too large, or the average particle size of the filler is too large, the transferability and the surface roughness are deteriorated, but if a filler having an adequate average particle size is contained in an adequate amount, a transferability and a surface roughness as excellent as those of a not containing a filler can be obtained.

Next, as Experiment 6, with respect to the sample discs of Examples 6 and 7, and Comparative Example 2, the modulus of elasticity and the resonance frequency were studied. The results are shown in Table 4.

TABLE 4

|  | Modulus of elasticity (kgf/cm$^2$) | Resonance frequency (Hz) |
| --- | --- | --- |
| Example 6 | 450 | 548.8 |
| Example 7 | 410 | 523.9 |
| Comparative Example 2 | 240 | 400.1 |

From Table 4, it is seen that by containing a filler, the resonance frequency can be increased. If the servo band is 450 Hz, since it is required to generate the resonance frequency larger than 450 Hz, in sample discs of Examples 6 and 7, the servo output signal could be separated sufficiently at the time of record regeneration by the MR head.

What is claimed is:

1. A magnetic disc comprising an injection molded thermoplastic norborene resin substrate and a magnetic layer formed on said substrate, said disc having a servo band and servo mark-forming portions and said substrate having concave and convex portions in said servo mark-forming portions, said substrate having a convex shaped recording track-forming portion and a concave shaped guard band-forming portion, said substrate having a thickness sufficiently great to impart a resonant frequency to the disc that is greater than the servo band frequency, said magnetic layer formed such that the magnetized directions of the convex and concave portions in the servo mark-forming portions are opposite to each other.

2. A magnetic disc according to claim 1, wherein the substrate has a diameter of 95 mm and a thickness of 2.6 to 3.0 mm.

3. A magnetic disc according to claim 1, wherein the substrate has a diameter of 65 mm and a thickness of 0.9 to 2.0 mm.

4. A magnetic disc according to claim 1, wherein the substrate has a diameter of 48 mm and a thickness of 0.5 to 1.8 mm.

5. A magnetic disc according to claim 1, wherein the substrate has a diameter of 34 mm and a thickness of 0.2 to 1.6 mm.

6. A magnetic disc according to claim 1 wherein said magnetic layer is formed on said substrate such that said magnetic layer is uniformly formed over said recording track-forming portion and the guard band-forming portion.

7. A magnetic disc according to claim 1, wherein said substrate further comprises a filler added to said thermoplastic norbornene resin, which filler is of an amount and of an average particle size and particle size distribution such that, as compared to a substrate without said filler, said filler imparts an increased modulus of elasticity to the substrate while not significantly increasing surface roughness above about 0.017 to about 0.019 μm.

8. A magnetic disc according to claim 7, wherein the substrate has a diameter of 95 mm and a thickness of 1.6 to 2.6 mm.

9. A magnetic disc according to claim 7, wherein the substrate has a diameter of 65 mm and a thickness of 0.5 to 1.8 mm.

10. A magnetic disc according to claim 7, wherein the substrate has a diameter of 48 mm and a thickness of 0.28 to 1.6 mm.

11. A magnetic disc according to claim 7, wherein the substrate has a diameter of 34 mm and a thickness of 0.10 to 1.4 mm.

12. A magnetic disc according to claim 7, wherein said filler is not exposed on the magnetic disc substrate, and said substrate is covered by a plastic composite matrix resin.

13. A magnetic disc substrate according to claim 12, wherein said filler comprises a spherical inorganic filler having an average particle size of 0.005 to 1.5 μm, being contained in an amount of 1 to 30 parts by weight, and the matrix resin comprises a thermoplastic resin, being contained in an amount of 70 to 99 parts by weight.

14. A magnetic disc according to claim 13, wherein said inorganic filler has a particle distribution such that particles in the range of ⅕ to 2 times the average particle size comprise 70% by weight of the filler.

15. A magnetic disc comprising an injection molded thermoplastic norborene resin substrate and a magnetic layer for said substrate, said disc having servo band and servo mark-forming portions and said substrate having concave and convex portions in said servo mark-forming portions, said substrate having a convex shaped recording track-forming portion and a concave shaped guard band-forming portion, said substrate having a thickness sufficiently great to impart a resonant frequency to the disc that is greater than the servo band frequency, said magnetic layer forms such that said magnetized directions of the concave and convex portions in the servo mark-forming portions are opposite to each other, the substrate having a coefficient of linear expansion from about $3 \times 10^{-5}$ to $6 \times 10^{-5}$/° C.

16. The magnetic disc of claim 15, wherein the substrate has a flexural modulus of elasticity from about 25,000 to 70,000 kg/cm$^2$.

17. A magnetic disc comprising an injection molded thermoplastic norborene resin substrate and a magnetic layer formed on said substrate, said disc having servo band and servo mark-forming portions and said substrate having concave and convex portions in said servo mark-forming portions, said substrate having a convex shaped recording track-forming portion and a concave shaped guard band-forming portion, said substrate having a thickness sufficiently great to impart a resonant frequency to the disc that is greater than the servo band frequency, said magnetic layer formed such that the magnetized directions of the convex and concave portions in the servo mark-forming portions are opposite to each other, said substrate also comprising a filler added to said thermoplastic norborene resin, which filler comprises particles with an average particle size of between 0.005–1.5 μm and having a particle size distribution in which particles in the range of ⅕ to 2 times the average particle size comprise at least seventy percent by weight of the filler.

18. The magnetic disc of claim 17, wherein the average particle size of the filler is from 0.01 to 0.8 μm.

19. The magnetic disc of claim 17, wherein the average particle size of the filler is from about 0.05 to about 0.6 μm.

20. The magnetic disc of claim 17, wherein the particle size distribution of the filler is such that particles in the range of ⅕ to 2 times the average particle size comprise at least about 80% by weight of the filler.

21. The magnetic disc of claim 17, wherein the small particle size distribution of the filler is such that particles in the range of ⅕ to 2 times the average particle size comprise at least about 90% by weight of the filler.

22. The magnetic disc of claim 17, wherein the particles of the filler are substantially spherical in shape.

23. The magnetic disc of claim 17, wherein the substrate comprises 70 to 99 weight percent of said thermoplastic norborene resin and correspondingly 30 to 1 weight percent of an inorganic filler having a spherical shape with an average particle of 0.005 to 1 μm.

24. The magnetic disc of claim 23, wherein said substrate comprises 75 to 95 weight percent of said thermoplastic norborene resin and correspondingly 25 to 5 weight percent of said inorganic filler.

25. The magnetic disc of claim 24, wherein the substrate comprises 80 to 90 weight percent of said thermoplastic norborene resin and correspondingly 20 to 10 weight percent of said inorganic filler.

26. The magnetic disc of claim 17, wherein said servo mark is from about 0.6 μm to about 1.2 μm in size.

* * * * *